(12) United States Patent
Fukushima (10) Patent No.: US 7,184,755 B2
(45) Date of Patent: Feb. 27, 2007

(54) INFORMATION EXCHANGE SYSTEM

(75) Inventor: Nobuo Fukushima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 498 days.

(21) Appl. No.: 10/819,647

(22) Filed: Apr. 7, 2004

(65) Prior Publication Data

US 2004/0203671 A1    Oct. 14, 2004

(30) Foreign Application Priority Data

Apr. 11, 2003   (JP)  ............... 2003-108017

(51) Int. Cl.
*H04Q 7/38*    (2006.01)
(52) U.S. Cl. ............... 455/414.3; 455/414.4; 455/414.1
(58) Field of Classification Search ............ 455/414.3, 455/414.4, 414.2, 414.1, 424, 425, 420, 412.1, 455/456.2, 457, 500, 517
See application file for complete search history.

(56) References Cited

U.S. PATENT DOCUMENTS 6,047,176 A * 4/2000 Sakamoto et al. ....... 455/422.1
6,424,705 B1 * 7/2002 Kikuchi et al. ........ 379/114.01
2003/0005121 A1 * 1/2003 Washio et al. ............... 709/225
2005/0249351 A1 * 11/2005 Miyahara .................... 380/255

FOREIGN PATENT DOCUMENTS

| JP | 2001-331443 | 11/2001 |
|---|---|---|
| JP | 2001-333451 | 11/2001 |
| JP | 2002-058069 | 2/2002 |
| JP | 2002-165009 | 6/2002 |
| JP | 2003-016005 | 1/2003 |
| JP | 2003-061154 | 2/2003 |

\* cited by examiner

*Primary Examiner*—Matthew D. Anderson
*Assistant Examiner*—Tan Trinh
(74) *Attorney, Agent, or Firm*—Morgan & Finnegan, LLP

(57) ABSTRACT

A control apparatus controls information exchange among portable terminals which perform wireless communication via a communication network. A unit accepts a specific information-provision request from a first portable terminal. A unit determines a prescribed area based on the accepted information-provision request. A unit sends the information-provision request to a second portable terminal in the prescribed area. A unit accepts a response to the information-provision request from the second portable terminal. A unit sends the response to the information-provision request to the first portable terminal.

21 Claims, 10 Drawing Sheets

LOCATION: MOUNTAIN A AND ENVIRONS

WANT INFORMATION FOR TIME PERIOD --:--, --/-- TO --:--, --/--

| | | | |
|---|---|---|---|
| ■ TYPE OF FLOWER | ■ CHERRY BLOSSOMS | | |
| ■ BLOOMING CONDITION | --% | | 2 POINTS |
| ■ BEST TIME FORECAST | IN -- DAYS | | 2 POINTS |
| ■ WEATHER | ■ FAIR ■ CLOUDY ■ RAIN | XX | 2 POINTS |
| ■ TEMPERATURE | ■ --°F ■ WARM ■ CHILLY | XX | 2 POINTS |
| ■ WIND | ■ STRONG ■ SOMEWHAT STRONG ■ WEAK ■ NONE | | 2 POINTS |
| ■ PARKING | ■ NO VACANCIES ■ FEW VACANCIES ■ VACANCIES | | 2 POINTS |
| ■ OTHER | XX | | |
| RELIABILITY | ☐ A OR GREATER ☐ B OR GREATER ■ C OR GREATER ☐ D OR GREATER ☐ NONE | | |

FIG. 6

| LOCATION: MOUNTAIN A AND ENVIRONS | | | |
|---|---|---|---|
| WANT INFORMATION FOR TIME PERIOD 16:00, 3/29 TO 17:30, 3/29 | | | |

| | | | |
|---|---|---|---|
| ■ TYPE OF FLOWER | ■ CHERRY BLOSSOMS | | 2 POINTS |
| ■ BLOOMING CONDITION | --% | | 0 POINTS |
| ☐ BEST TIME FORECAST | IN -- DAYS | | |
| ■ WEATHER | ■ FAIR | ☐ CLOUDY ■ RAIN XX | 2 POINTS |
| ■ TEMPERATURE | ☐ --°F | ■ WARM ■ CHILLY XX | 1 POINTS |
| ■ WIND | ■ STRONG | ■ SOMEWHAT STRONG ■ WEAK ■ NONE | 1 POINTS |
| ☐ PARKING | ☐ NO VACANCIES | ☐ FEW VACANCIES ☐ VACANCIES | 0 POINTS |
| ■ OTHER | IS THERE A PLACE FOR A PARTY AVAILABLE? | | 2 POINTS |
| RELIABILITY | ☐ A OR GREATER | ■ B OR GREATER ☐ C OR GREATER ☐ D OR GREATER ☐ NONE | |

| LOCATION: MOUNTAIN A AND ENVIRONS | |
|---|---|
| WANT INFORMATION FOR TIME PERIOD 16:00, 3/29 TO 17:30, 3/29 | |

| TYPE OF FLOWER | CHERRY BLOSSOMS | | |
|---|---|---|---|
| ■ BLOOMING CONDITION | --% | | 2 POINTS |
| ■ WEATHER | ☐ FAIR | ☐ CLOUDY ☐ RAIN | 2 POINTS |
| ■ TEMPERATURE | ☐ WARM | ☐ CHILLY XX | 1 POINTS |
| ■ OTHER | IS THERE A PLACE FOR A PARTY AVAILABLE? XX | | 2 POINTS |
| RELIABILITY OF OTHER PARTY | B | | |
| INQUIRY POSSIBLE? | ☐ E-MAIL | ☐ TELEPHONE | 5 POINTS |
| TIME LIMIT | UNTIL --/-- | | |

FIG. 9

LOCATION: MOUNTAIN A AND ENVIRONS

WANT INFORMATION FOR TIME PERIOD 16:00, 3/29 TO 17:30, 3/29

TYPE OF FLOWER | CHERRY BLOSSOMS

■ BLOOMING CONDITION | 80% | | 2 POINTS

■ WEATHER | ■ FAIR ☐ CLOUDY ☐ RAIN xx | 2 POINTS

■ TEMPERATURE | ☐ WARM ■ CHILLY xx | 1 POINTS

■ OTHER | IS THERE A PLACE FOR A PARTY AVAILABLE? | 2 POINTS
 | THERE ARE STILL SOME VACANCIES

RELIABILITY OF OTHER PARTY | B

INQUIRY POSSIBLE? | ■ E-MAIL ■ TELEPHONE | 8 POINTS

TIME LIMIT | UNTIL 3/30

FIG. 10

SELECT A RESPONSE TO INQUIRY 1

☐ RESPONSE 1-1-0 – RELIABILITY : A; BLOOMING CONDITION; WEATHER; TEMPERATURE; OTHER INQUIRY: E-MAIL; TELEPHONE; UNTIL 3/30

☐ RESPONSE 1-2-0 – RELIABILITY: B; BLOOMING CONDITION; WEATHER; TEMPERATURE

INFORMATION EXCHANGE SYSTEM

FIELD OF THE INVENTION

This invention relates to an information exchange system for distributing, e.g., digital content to user terminals and for managing such content.

BACKGROUND OF THE INVENTION

When an individual is headed for a remote destination, the individual may be concerned about weather, traffic and congestion conditions at the destination.

A method of acquiring such information known in the art includes accessing a site (a website), which provides information about the destination, by a mobile telephone or personal computer via the Internet to thereby obtain the related information at the website or post the details of the desired content on a bulletin board in the expectation that a third party will respond to this posting by placing the desired information on the bulletin board.

Information exchange systems that use a mobile telephone are described in the specifications of Japanese Patent Application Laid-Open Nos. 2003-061154, 2003-016005, 2002-165009, 2002-058069, 2001-333451 and 2001-331443.

Though general information is published at a website, it is not easy to find information for a specific purpose relating to a specific region. For example, if an individual wishes to view cherry trees in bloom, weather information may relate to a relatively wide area that includes tourist attractions and neighboring areas, or the information may be too old. With the exception of certain limited locations that are well known, it is almost impossible to acquire information such as the weather and temperature, congestion and quality of visibility on various mountaintops at a certain time.

Further, even if it is attempted provide information relating to such famous locations, publishing and updating information requested by each and every individual requires a great amount of labor.

In addition, information published on a bulletin board is not very reliable in the first place and even if a question is posted on a bulletin board, there is no assurance that anyone will respond positively. Even if a response is received, the time at which the information is necessary may have passed.

SUMMARY OF THE INVENTION

The present invention has been made in consideration of the above situation and its object is to eliminate the above-mentioned difficulties and make it possible to obtain highly reliable information in suitable fashion.

According to the present invention, the foregoing object is attained by providing an information exchange system for exchanging information with a plurality of portable terminals via at least one control apparatus using a communication network, wherein: each of the plurality of portable terminals has a wireless communication unit that is wirelessly connected for communication with the communication network; a first portable terminal among the plurality of portable terminals has a unit that transmits data for a specific information-provision request to a second portable terminal, which is present in a prescribed area, among the plurality of portable terminals; the second portable terminal has a unit for sending information back to the first portable terminal in response to an information-provision request from the first portable terminal; and the control apparatus accumulates prescribed points for the second portable terminal in accordance with the information sent back from the second portable terminal.

According to the present invention, the foregoing object is also attained by providing a control method by a control apparatus for controlling exchange of information among a plurality of portable terminals which perform wireless communication via a communication network, comprising: accepting a specific information-provision request from a first portable terminal among the plurality of portable terminals; determining a prescribed area based on the accepted information-provision request; sending the information-provision request to a second portable terminal in the prescribed area among the plurality of portable terminals; accepting a response to the information-provision request from the second portable terminal; and sending the response to the information-provision request to the first portable terminal.

According to the present invention, the foregoing object is also attained by providing a control apparatus for controlling exchange of information among a plurality of portable terminals which perform wireless communication via a communication network, comprising: a unit adapted to accept a specific information-provision request from a first portable terminal among the plurality of portable terminals; a unit adapted to determine a prescribed area based on the accepted information-provision request; a unit adapted to send the information-provision request to a second portable terminal in the prescribed area among the plurality of portable terminals; a unit adapted to accept a response to the information-provision request from the second portable terminal; and a unit adapted to send the response to the information-provision request to the first portable terminal.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail in accordance with the accompanying drawings.

Figure 1:
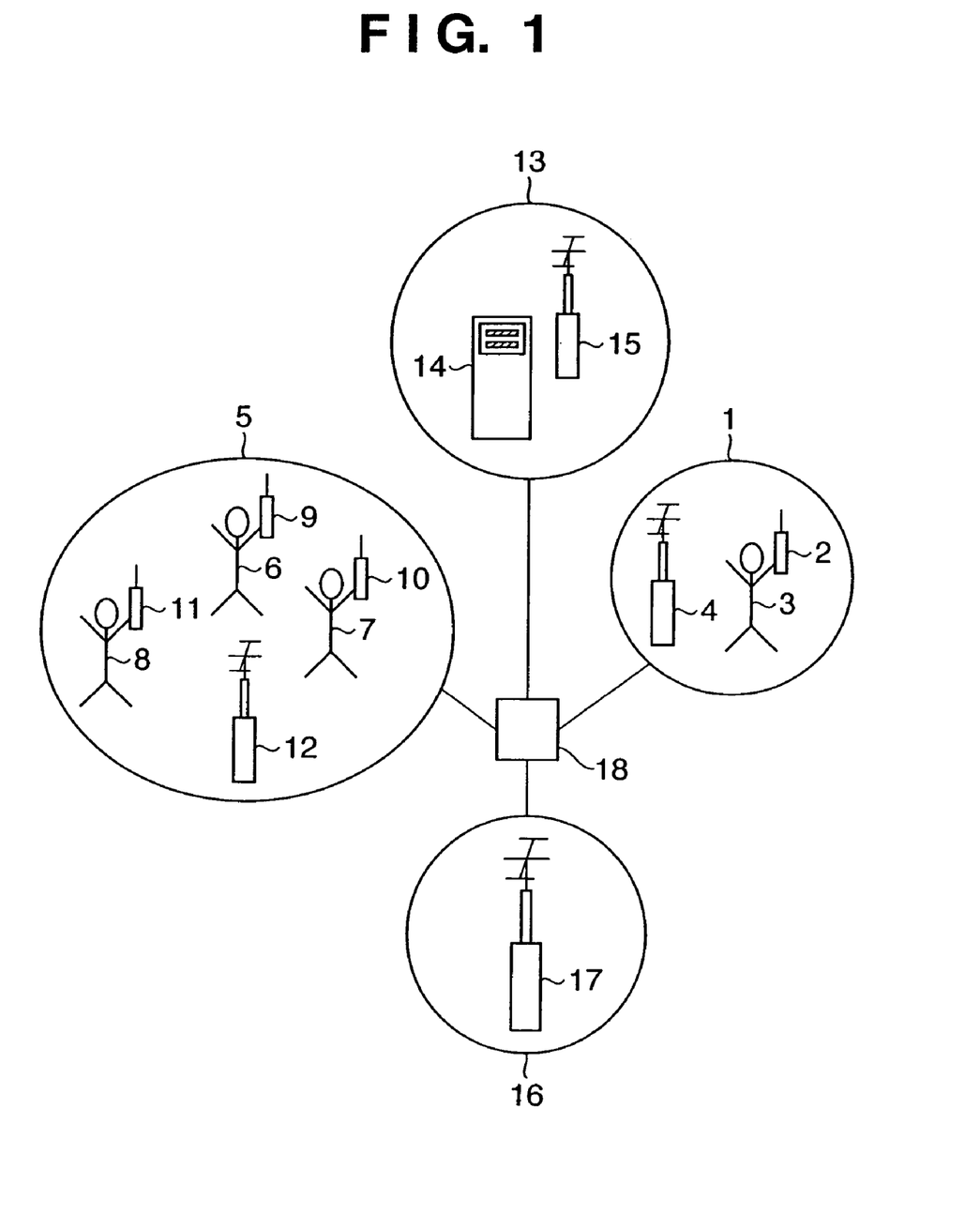
FIG. 1 is a diagram illustrating the overall configuration of a system according to an embodiment of the present invention.

FIG. 1 is a diagram illustrating the overall configuration of a system according to an embodiment of the present invention. Illustrated are a first communication area 1, a communication terminal 2 present in the first communication area 1, a person 3 who operates the terminal 2 in the first communication area 1, a communication base station 4 in the first communication area 1, a second communication area 5, communication terminals 9, 10 and 11 present in the second communication area 5, persons 6, 7 and 8 who operate the terminals 9, 10 and 11, respectively, in the second communication area 5, a communication base station 12 in the second communication area 5, a third communication area 13, a server 14 present in the third communication area 13, a communication base station 15 in the third communication area 13, a fourth communication area 16, a communication base station 17 in the fourth communication area 16, and a transit station 18 that connects the communication base stations.

Figure 2:
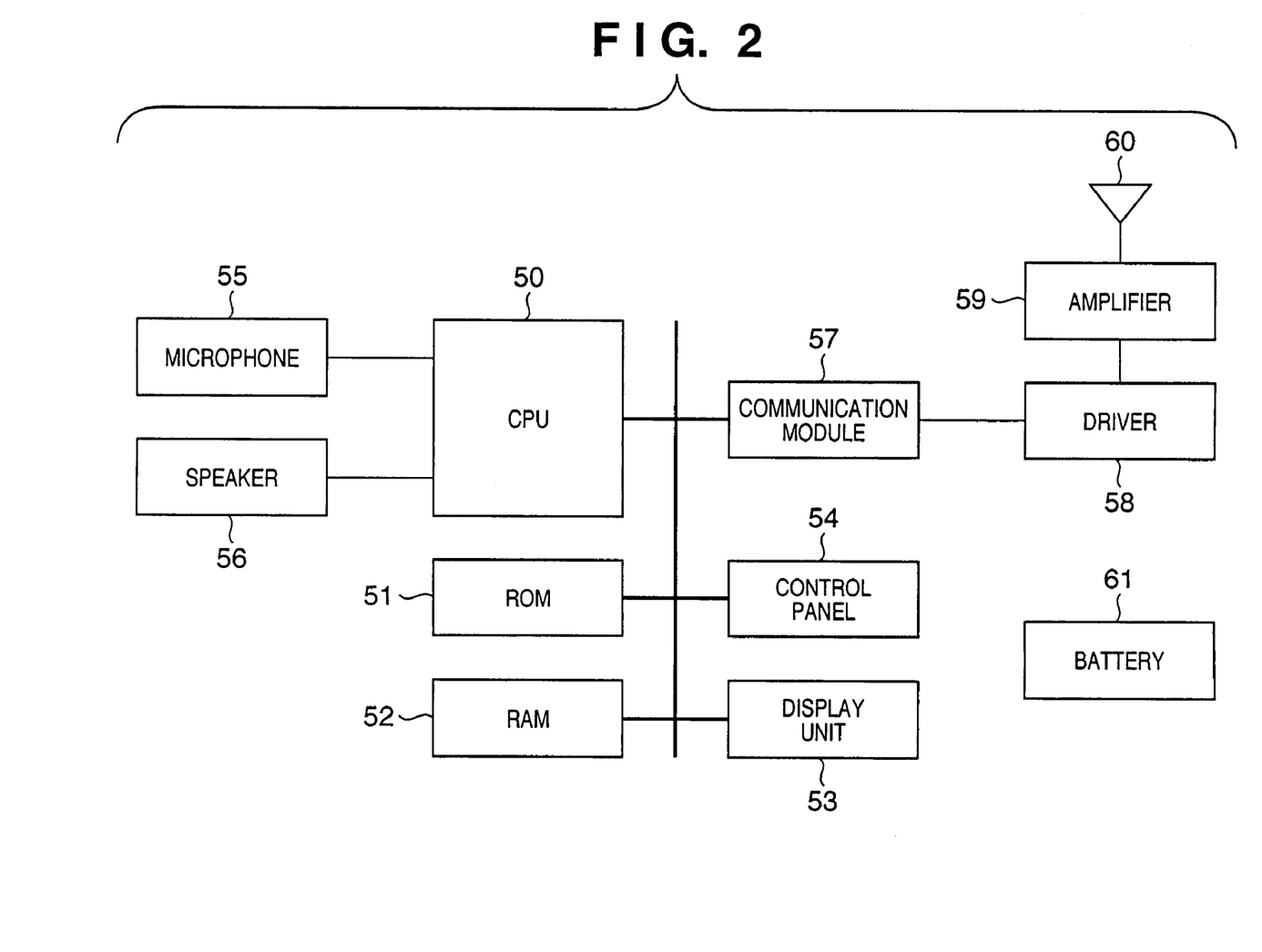
FIG. 2 is a block diagram of communication terminals shown in FIG. 1.

FIG. 2 is a block diagram illustrating an example of the internal structure of the communication terminals 2, 9, 10 and 11. Each terminal includes a CPU 50; a ROM memory 51 such as a flash memory for storing the operating program of the CPU 50; a RAM 52 serving as a work area of the CPU 50; a display unit 53 such as a liquid crystal display (LCD) for notifying the operator of terminal status and the like; a control panel 54 having a group of keys used for entering telephone numbers and characters and buttons for setting various modes; a microphone 55 for voice input; a speaker 56 for reproducing voice, an incoming-call tone and an incoming-call melody and the like; a communication module 57 that performs an operation such as signal modulation for sending and receiving wireless communication data; a driver 58 for transmitting communication data; an amplifier 59 for amplifying a radio signal; a radio antenna 60; and a battery 61 for supplying power to all of the circuitry.

Figure 3:
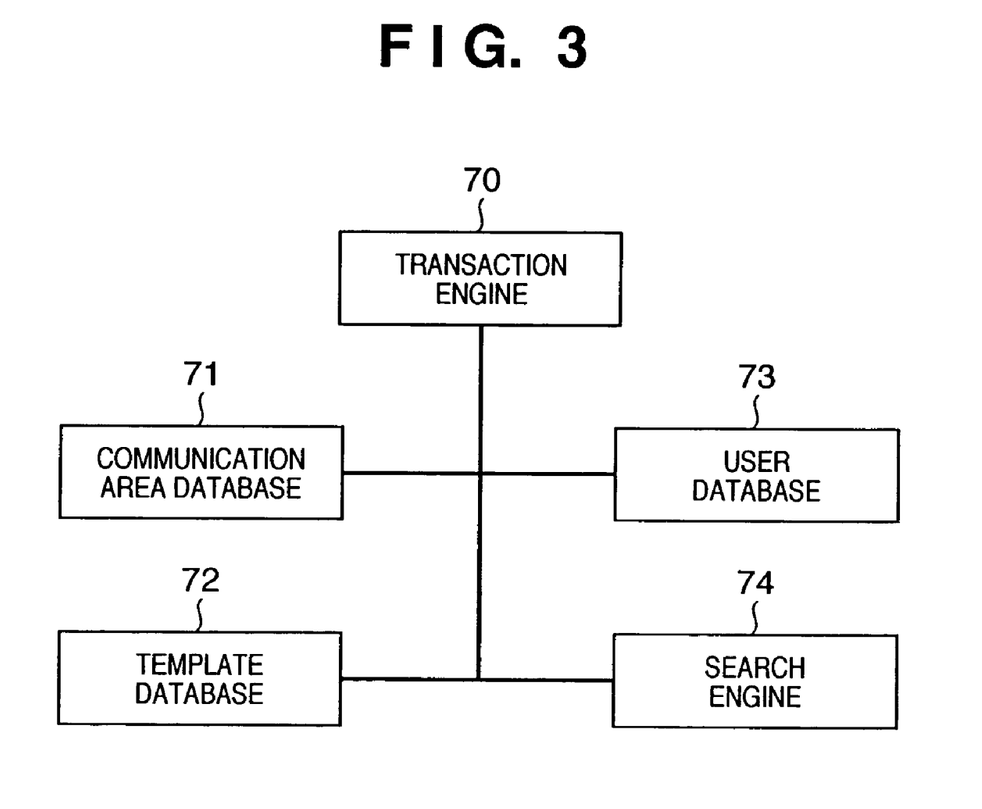
FIG. 3 is a functional block diagram of a server shown in FIG. 1.

FIG. 3 is a functional block diagram of the server 14 shown in FIG. 1. The server 14 includes a transaction engine 70 for exchanging communication data; a communication area database 71 in which data relating to the communication areas is stored; a template database 72 in which template information, described later, is stored; a user database 73 for managing terminal IDs and telephone numbers as well as points described later; and a search engine 74 that searches for appropriate information from various databases.

The operation of this embodiment will be described in regular order taking as an example a case where an individual wishes to obtain information relating to cherry-blossom viewing on a certain mountain. The situation assumed is: "The present date and time is March 29, 5:00 PM. I wish to view cherry blossoms this evening. Is this the best time?"

Figure 4:
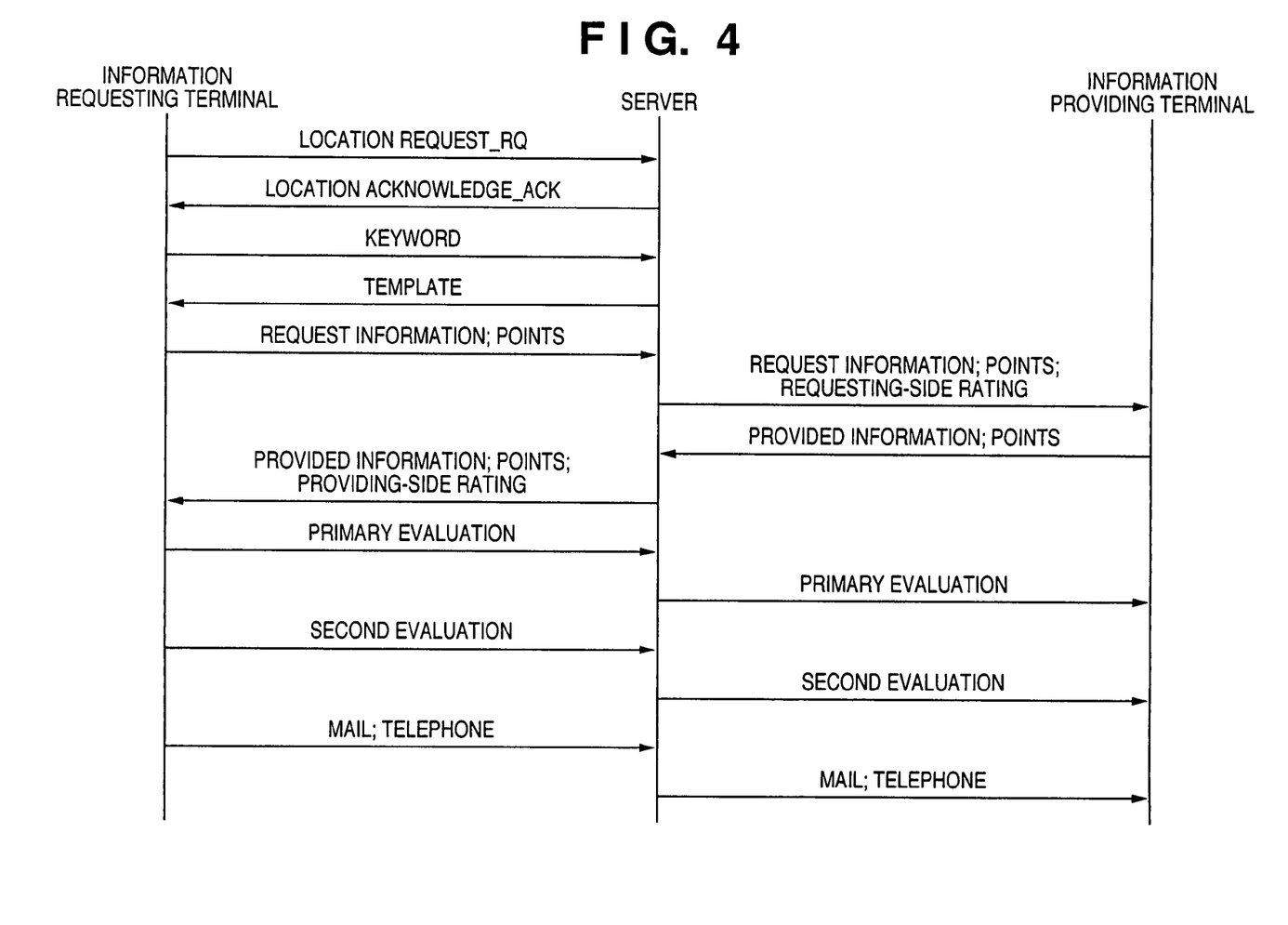
FIG. 4 is a diagram useful in describing exchange of data among an information requesting terminal, an information providing terminal and a server according to the embodiment of the present invention.

FIG. 4 illustrates exchange of data among three parties, namely an information requesting terminal, a server and an information providing terminal. For example, assume that a person wishing cherry-blossom viewing information is the person 3 in the first communication area 1. Further, assume that Mountain A, which is the location for cherry-blossom viewing, is present in the second communication area 5. In other words, the information requesting terminal is the communication terminal 2 and the information providing terminal is any of the communication terminals 9, 10, 11 situated in second communication area 5.

The person 3 who desires the information operates the control panel 54 of the portable terminal 2, transmits information indicating the desired location (Mountain A) to the server 14 and registers the information with the server 14. The location information is transmitted to the server 14 together with a specific ID code, which identifies the terminal 2, via the communication base stations 4, 15.

Using the search engine 74, the server 14 searches the communication area database to find the base station of the communication area that has the location indicated by the location information from the portable terminal 2. On the basis of the previous assumption, it is ascertained that the desired location (Mountain A) is in the second communication area 5 of the base station 12. The server 14 determines that the searched location exists and sends this information back to the portable terminal 2. The portable terminal 2 responds by shifting to a mode in which the details of requested information are set.

In setting of requested information, the person 3 enters keywords of the desired information to the portable terminal 2. Examples of the keywords are "CHERRY BLOSSOMS", "VIEWING" and "BEST TIME". The portable terminal 2 transmits the entered keywords to the server 14. The template database 72, which contains keywords and information input templates, is constructed in the server 14 from the search histories of users thus far. The server 14 starts up the search engine 74 and calls a template candidate from the template database 72. For example, the server 14 calls a parking-vacancy information template based upon keywords "PARKING" and "VACANCY" and calls a trout-fishing information template based upon keywords "FISHING", "LAKE" and "TROUT".

In this example, the server 14 determines from the keywords "CHERRY BLOSSOMS, VIEWING, BEST TIME" that the person 3 requires information relating to viewing of cherry blossoms and, based upon the result of the search, transmits the template for cherry-blossom viewing to the portable terminal 2. If keywords are ambiguous, a plurality of template candidates may be retrieved. In such case the server 14 limits the number of template candidates to a prescribed number and transmits this number of candidates to the information requesting terminal 2, thereby allowing the person 3 to select one appropriate template.

Figure 5:
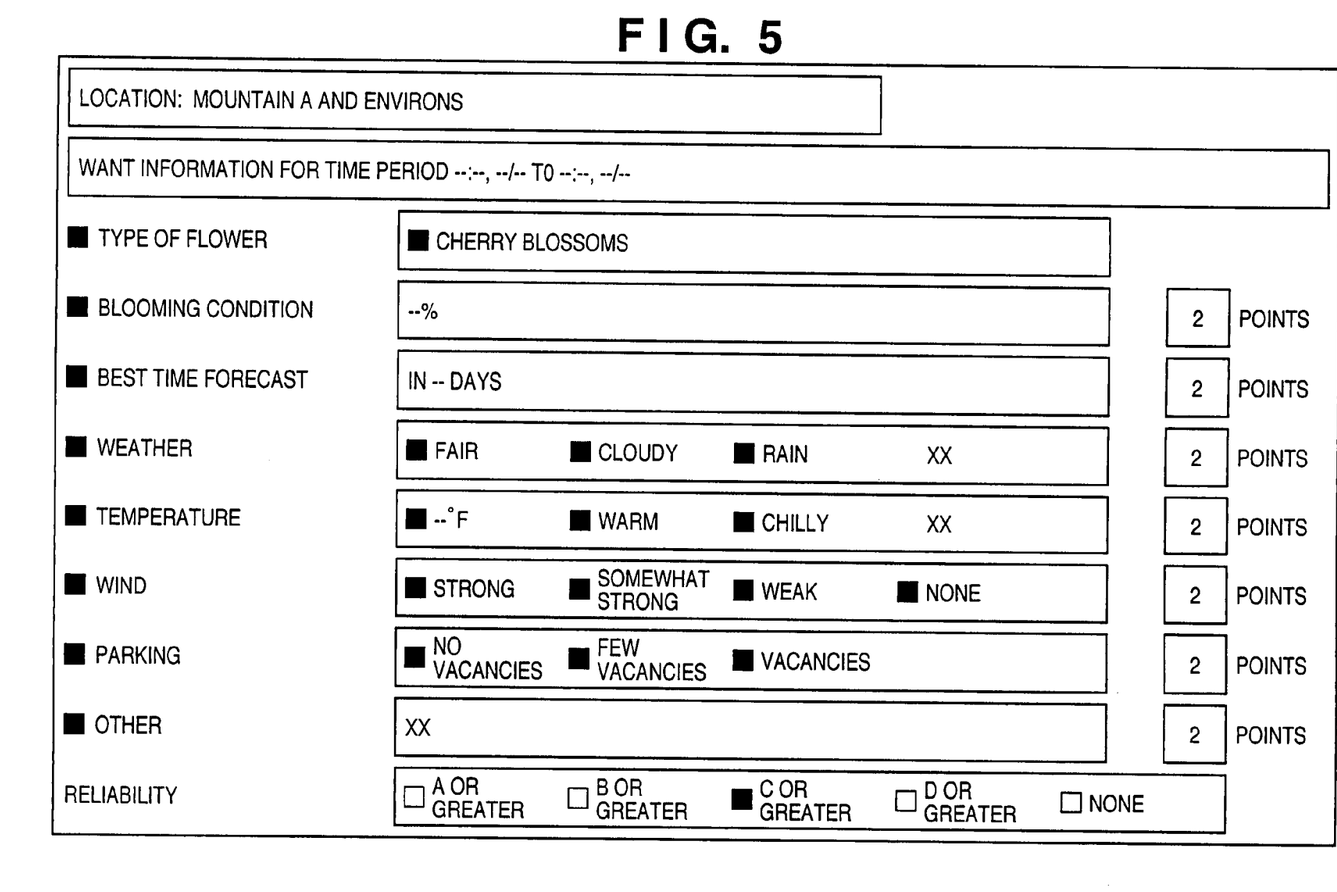
FIG. 5 illustrates an example of an information requesting template displayed on a screen of an information requesting terminal according to the embodiment of the present invention.

The terminal 2 displays the sent template on the display unit 53 and the person 3 enters detailed items of the desired information in accordance with guidance provided by the template. FIG. 5 illustrates a template displayed on the display unit 53 of the terminal 2. Portions indicated by "—" and "XX" indicate areas where entries are to be made by the operator. Basically, one item is selected from choices and is entered in a "—" area, and any entry is made in an "XX" area. Further, a black box (■) indicates a selected state and a white box (□) indicates an unselected state. In the example of the template shown in FIG. 5, approximate values and selection items that have been determined from keywords and past history have been set by the server 14 beforehand. Accordingly, using the information requesting terminal 2 that has received this template, the operator need only revise those portions that differ from his/her own requirements in the items preset by the server 14. This reduces the labor involved in making inputs.

Figure 6:
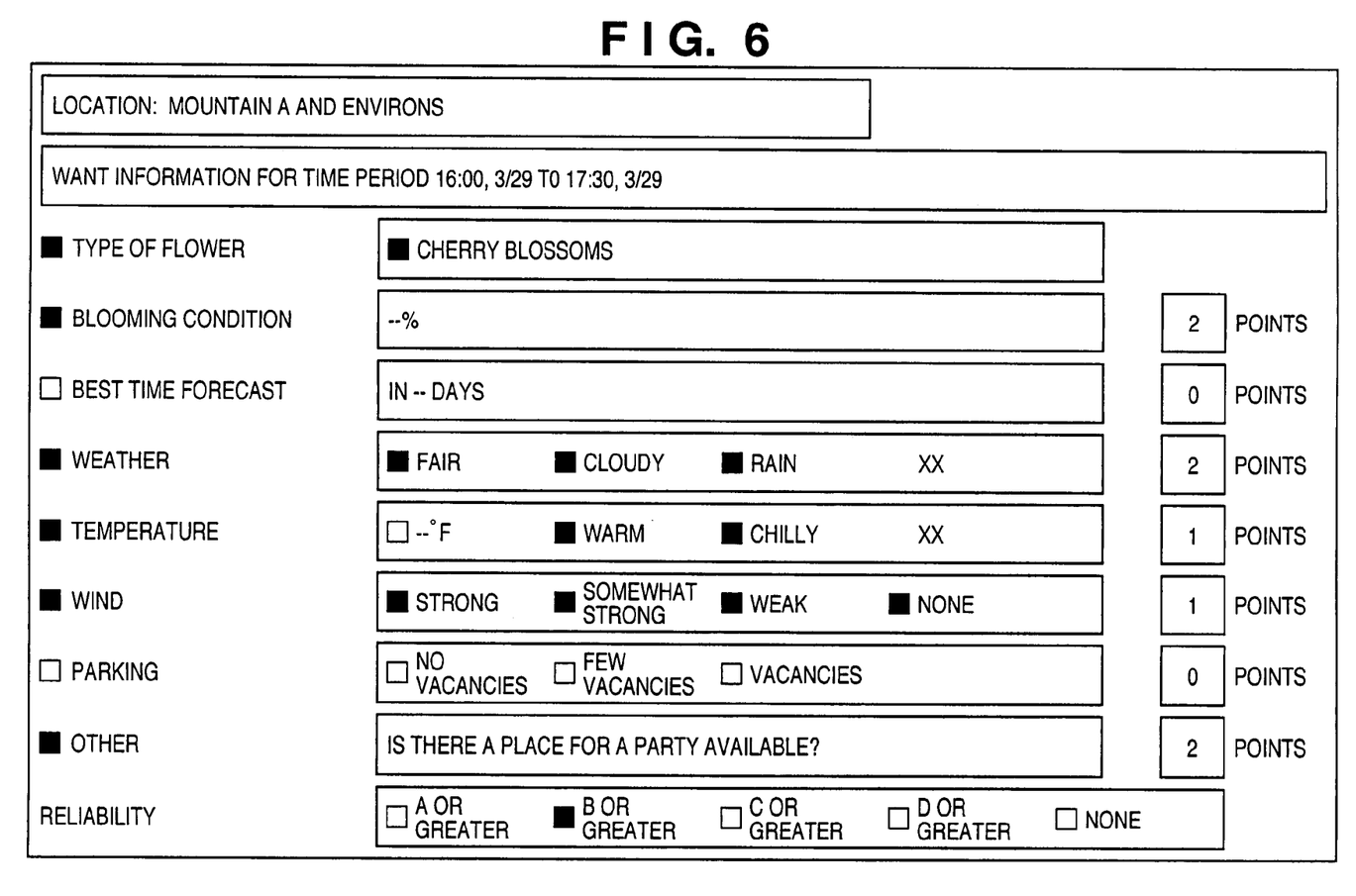
FIG. 6 illustrates an example of the information requesting template, after entries have been made on the template, displayed on the screen of the information requesting terminal according to the embodiment of the present invention.

FIG. 6 illustrates an example of the screen after detailed information has been entered. Operation up to the point at which the setting screen of FIG. 6 is obtained will be described in detail below. First, the range of desired times is entered on the screen shown in FIG. 5. Here it is assumed that information from 16:00 to 17:30 on March 29 is desired. This date and time information is entered.

"TYPE OF FLOWER" is verified. Here the server 14 has selected "CHERRY BLOSSOMS" judging from the keywords.

The item "BLOOMING CONDITION" is left selected (■). Further, two points have been selected provisionally by the server 14. These points will be described later.

The item "BEST TIME FORECAST" is made unselected by reason of the fact that the operator is not interested in this item. In other words, ■ is changed to □.

The item "WEATHER" is selected, an example of a response (fair, cloudy, etc.) is selected and two points are set.

The item "TEMPERATURE" is selected, an example of a response (cold, chilly or warm) is selected and a single point is set.

The item "WIND" is selected, an example of a response (strong, somewhat strong, weak or none) is selected and a single point is set.

The item "PARKING" is made unselected because the operator intends to go by train.

The item "OTHER" allows entry of characters freely. Here "IS THERE A PLACE FOR A PARTY AVAILABLE?" is entered. Two points are set.

Finally, B or greater is selected as reliability. Reliability will be described later.

Thus the information-request data is completed. After the operator checks the entered items, the information requesting terminal 2 sends the template to the server 14. Thereby the information-request data requested by the person 3 is registered on the server 14.

Next, the points mentioned above will be explained. The points serve as criteria for having the information provider judge the degree to which the particular information wishes to be known by the receiving side. The points are presented to the information provider from the information receiving side.

In the example of "CHERRY-BLOSSOM VIEWING" above, the information provider can guess from the status of "TEMPERATURE" that the information requesting side is concerned about "BLOOMING CONDITION" and "WEATHER" and can roughly judge, based upon the number of points, what to emphasize when responding to the information requesting side.

The server 14 that operates this system manages the points, and a service is provided in accordance with the points. For example, an information providing terminal that can respond in accordance with requested information earns points. If this information providing terminal subsequently seeks information of some kind (i.e., becomes an information requesting terminal), then this terminal can acquire the information using the number of points earned or can receive a discount on the communication charges. The points are stored in the user database 73 of the server 14.

Further, reliability is set at the end of the procedure for creating the information-request data. This specifies the reliability rating of the information provider. Though rating will be described later, it is possible to select whether to obtain information from a highly rated information provider in the hope that the information will be highly reliable or to improve the quality of information by obtaining a large quantity of information from a greater number of individuals even though the reliability may be somewhat low.

The server 14 transmits the information-request data to the base station 12. The base station 12 broadcasts the information-request data to the plurality of portable terminals 9, 10 and 11 in the communication area 5 of the base station 12. The portable terminals 9, 10 and 11 are set in advance as to whether or not they will accept the information request.

Figure 7:
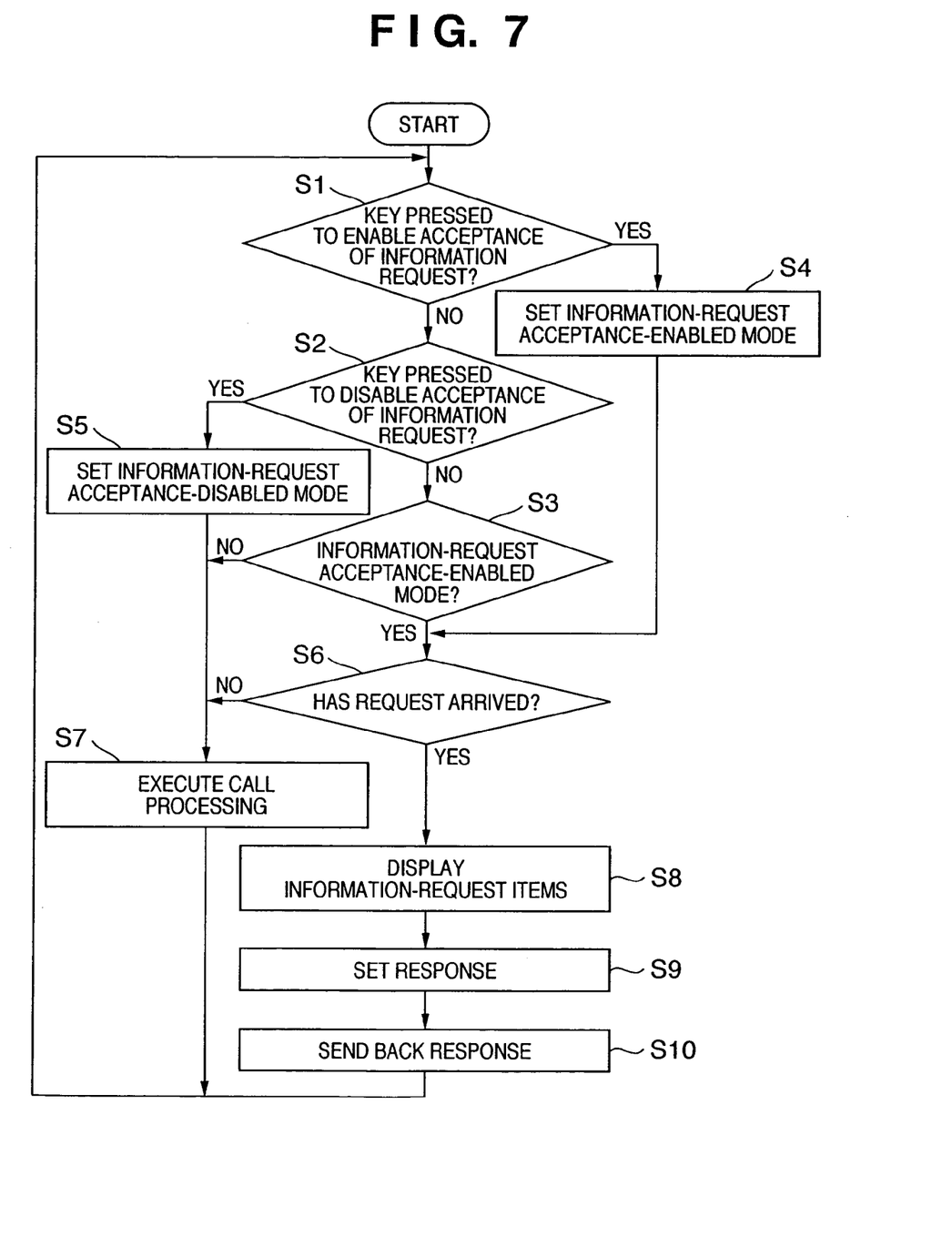
FIG. 7 is a flowchart for making a setting that makes it possible to accept an information request at a portable terminal according to the embodiment of the present invention.

FIG. 7 is a flowchart illustrating an example of an operation for setting whether or not a portable terminal is to accept an information request. It is determined at step S1 whether a setting operation for enabling acceptance of an information request has been performed. If the operation has been made, then an information-request acceptance-enabled mode is set at step S4 and control proceeds to step S6. If the setting operation has not been performed, then it is determined at step S2 whether an operation for disabling acceptance of an information request has been performed.

If the operation for disabling acceptance of an information request has been performed, then an information-request acceptance-disabled mode is set at step S5 and control proceeds to step S7. If this operation has not been performed in step S2, then it is determined at step S3 whether the information-request acceptance-enabled mode has already been set.

If it is found at step S3 that the information-request acceptance-enabled mode has already been set, then control proceeds to step S6; otherwise, control proceeds to step S7.

Step S7 is call processing for an ordinary call. The details of call processing do not relate to the essence of the present invention and are not described here. These details comprise call waiting and a call operation. If there is no call, control returns from step S7 to step S1.

It is determined at step S6 whether an information request has arrived. If a request has not arrived, then control returns to step S1 after step S7. If an information request has arrived, then information-request items are displayed at step S8 and a series of processes (steps S9, S10) (described below) such as setting of a response at step S9 and reply at step S10 are performed, thereafter control returns to step S1.

Thus, among the terminals 9, 10, 11 present in communication area 5 of base station 12, only a terminal that has been set to the information-request acceptance enable mode notifies the operator of the terminal that there is a request for information. For example, if there is a request for information, this fact is displayed on the terminal screen or notification is given as by an incoming-call tone or incoming-call vibrator (not shown). Here it is assumed that the terminal 9 of person 6 has accepted an information request.

The operator 6 of terminal 9 that has accepted the information request checks the content of the request. Content of the kind shown in FIG. 8, for example, is displayed on the screen of terminal 9. That is, items in accordance with selections made on the side of the information requesting party are displayed. On the basis of these items, the operator 6 can ascertain what information is being sought. The reliability of the other party refers to the rating of the information requesting side. This will be described later.

Figure 8:
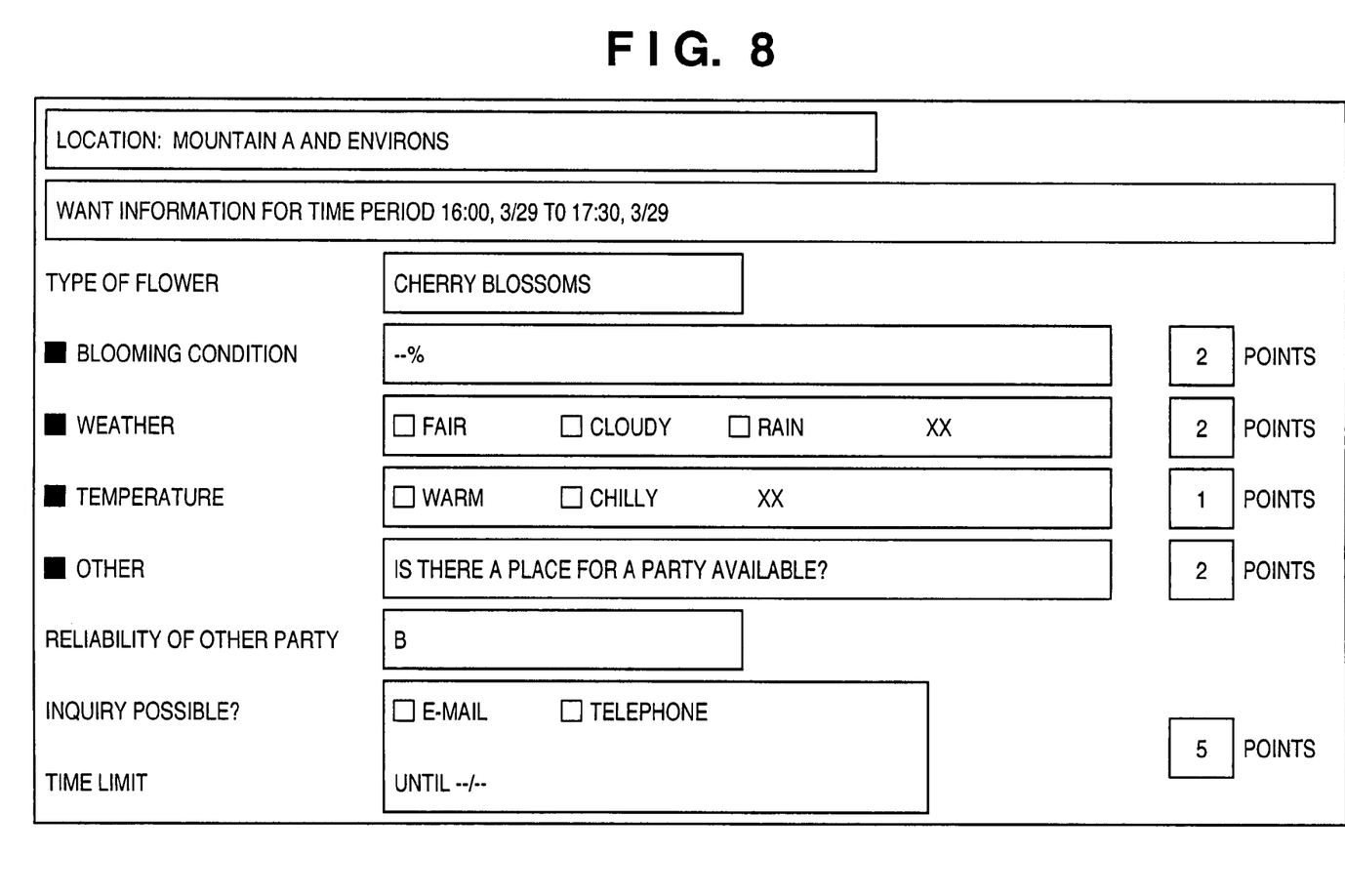
FIG. 8 illustrates an example of an information requesting template displayed on a screen of an information providing terminal according to the embodiment of the present invention.

The operator 6 takes into consideration the content of the request, the points for each item and the rating of the information requesting side. If the operator 6 intends to respond, then the operator responds in accordance with the screen guidance. If the operator does not intend to respond, then the operator discards the screen information as by performing a cancellation operation.

Figure 9:
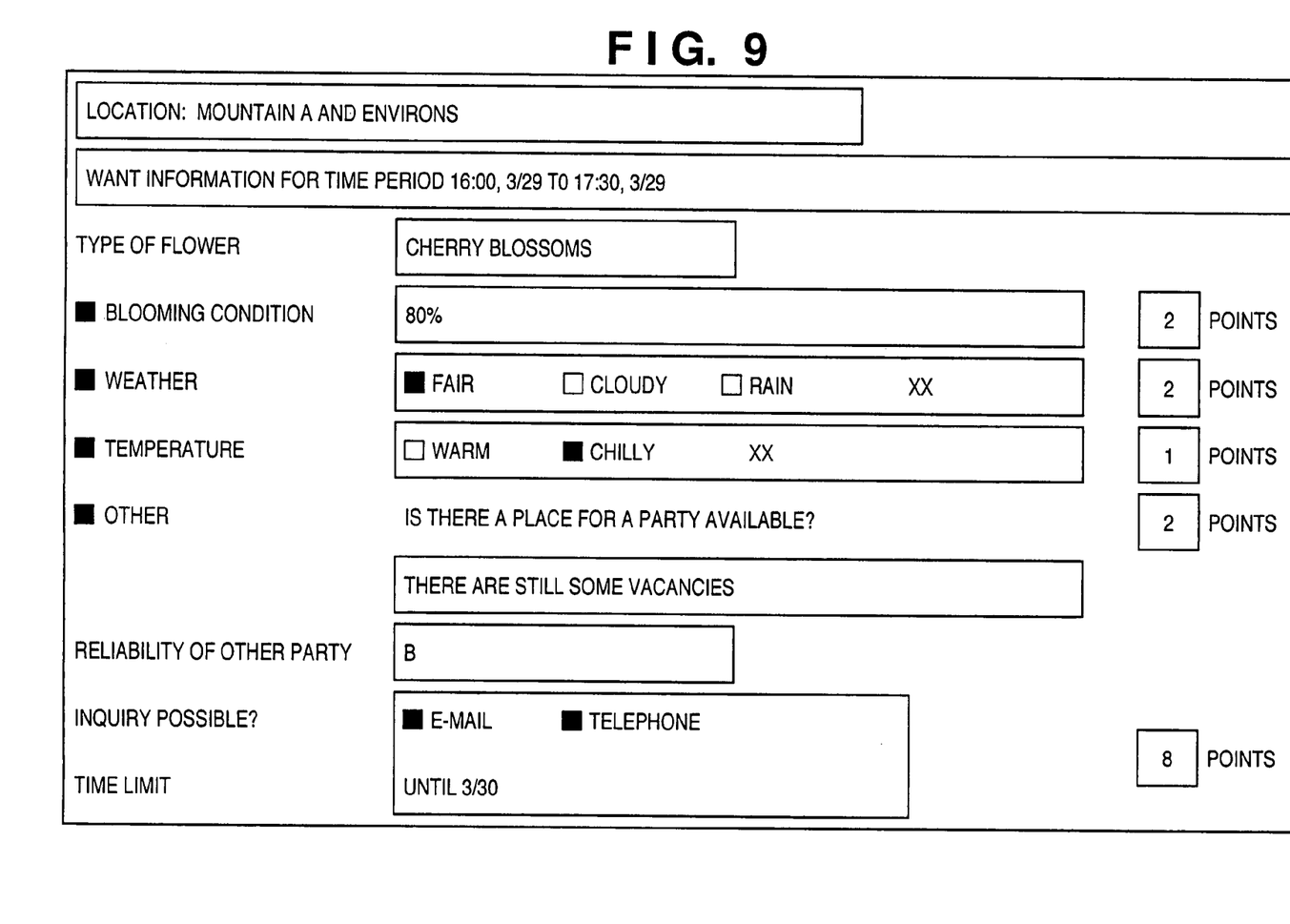
FIG. 9 illustrates an example of the information requesting template, after entries have been made on the template, displayed on the screen of the information providing terminal according to the embodiment of the present invention.

FIG. 9 illustrates an example of a response. Here "80" (%) is entered in the item "BLOOMING CONDITION", "FAIR" is selected for "WEATHER" and "CHILLY" is selected for the item "TEMPERATURE". "THERE ARE STILL SOME VACANCIES" is entered in the "OTHER" item in response to the freely-worded question. Both e-mail and a telephone call are allowed in an "INQUIRY ALLOWED?" item. Further, "UNTIL March 30" is entered in an item "TIME LIMIT", which is the time limit for the inquiry, and "8" is set as the number of points.

"INQUIRY ALLOWED?" specifies whether e-mail or a telephone call from the information requesting terminal will be accepted. It should be noted that it is so arranged that the telephone number and e-mail address of the information providing terminal are not directly disclosed to the information requesting terminal. The identification code of the information providing terminal 9, however, is reported. The server 14 associates the information providing terminal and the information requesting terminal. This makes possible an exchange by e-mail or telephone for a prescribed period of time. Identification codes such as numbers are assigned to requests and the responses thereto and it will suffice to make an inquiry upon selecting the information providing terminal 9 from the identification codes. The operator 3 of the information requesting terminal 2 establishes contact with the operator 6 of the information providing terminal 9 if the time is within the prescribed time period, thereby making it possible to obtain more detailed information and to ask questions with regard to the response. This is effective in a case where the operator 3 of the information requesting terminal 2 wishes to have a response from the same person not only for the time being but also several days later. Since there are cases where a person may be annoyed by arrival of inquires indefinitely, a time limit can be set on inquiries.

If a response has been prepared in the manner described above, then the terminal 9 sends the response information back to the server 14.

The response information from the base station 12 is transmitted to the terminal 2 via the server 14. At this time only the rating of a response and the items of the response are transmitted to the requesting terminal 2. There are also cases where the terminal 2 receives responses from a plurality of terminals. Upon taking into consideration ratings and the items of a response, the operator 3 of the terminal 2 selects the response that is to be employed from among the received responses. Of course, if the operator 3 of terminal 2 is satisfied with the content of one of those responses, the operator need not select other responses. For example, the operator 3 observes a terminal screen of the kind shown in FIG. 10 to determine whether a response should be accepted or not. In the example shown in FIG. 10, two responses have arrived.

Figure 10:
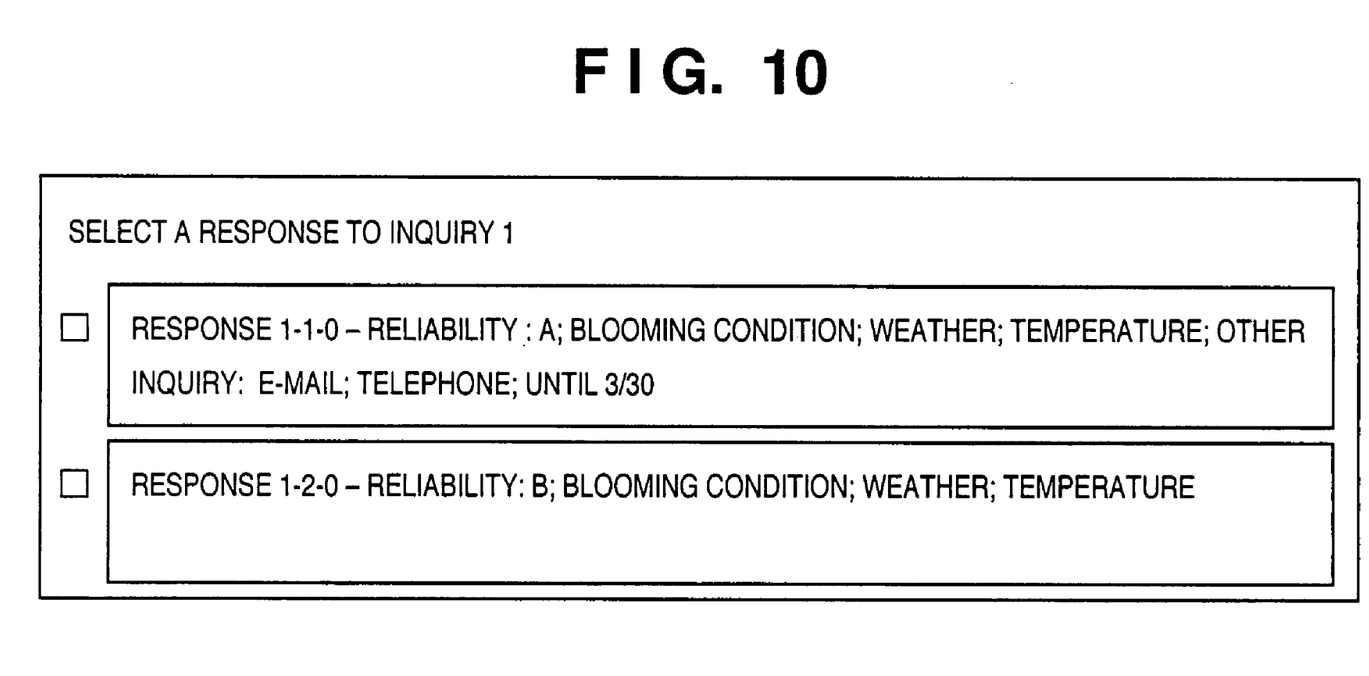
FIG. 10 shows an example of selection of responses displayed on the terminal screen on the information requesting side according to the embodiment of the present invention.

A response having Response No. 1-2-0 has a reliability rating of B and does not respond to the item "OTHER" among the requested items. In addition, inquiries also are not allowed. By contrast, a response having Response No. 1-1-0 has a reliability rating of A and responds to all requested items. Inquiries are possible as well. Assume that the operator 3 of terminal 2 judges that the desired information will be obtained if Response No. 1-1-0 is selected. In such case, therefore, the operator 3 selects Response No. 1-1-0 and transmits the result of the selection to the server 14. The requesting side pays points only for the response selected.

The server 14 sends the terminal 2 the details of the content of the response of Response No. 1-1-0 selected by the terminal 2. As a result, the details of the response of the selected Response No. 1-1-0 are displayed on the screen of the terminal 2.

The operator 3 of terminal 2 performs an evaluation as to whether the content of the response is that hoped for and, if the content is substantially as hoped, quits processing as is. If the response exceeds expectations, the initially set reward points (credit points) are transmitted to the server 14. If the response does not meet expectations, dissatisfaction points (debit points) are transmitted to the server 14.

The server 14 transmits the fact that the response has been selected by the requesting side to the terminal 9, which is the information providing terminal, and simultaneously provides the terminal 9 with points obtained by adding the reward points (or debiting dissatisfaction points) to the basic points.

The operator 3 of terminal 2 may thenceforth send e-mail to or call the information providing terminal 9 as necessary to inquire further in regard to more detailed content. Points are awarded to the information providing terminal 9 also with respect to telephone calls or e-mail accepted.

It is possible that the person 3 who has obtained a response and then gone to the actual location finds that the circumstances there differ from those contained in the response. In this case also a second response evaluation can be made within a predetermined period of time and the points awarded earlier can be re-evaluated. This result also is transmitted to the terminal 9 via the server 14. The latter accumulates the exchange of points that occurs with transmission of the information described here.

In accordance with the exchange of information and points, the server 14 calculates, for every terminal ID, the total number of requests issued by the ID, the number of reward points at the time of the request and the number of dissatisfaction points at such time, and rates information requesting terminals and information providing terminals in accordance with the particular history.

Rating will now be described. A terminal can become one on the information requesting side and one on the information providing side as well. Accordingly, a terminal can be rated as an information requesting terminal and as an information providing terminal on a per-terminal-ID basis. Assume that there are five ratings, namely ratings A, B, C, D and E. Examples of ratings on the information requesting side are as follows:

A: Very reliable; award appropriate points
  B: Fairly reliable
  C: Ordinary, with little record of performance
  D: Occasional dissatisfaction points
  E: Frequent dissatisfaction points; many complaints Examples of ratings on the information providing side are as follows:

A: Very reliable
  B: Fairly reliable
  C: Ordinary, with little record of performance
  D: Information sometimes erroneous
  E: Unreliable Rating is changed in accordance with the number of exchanges using rating C, for example, as the initial value.

An example of a method of rating on the information requesting side is as follows: If the ratio of dissatisfaction points to number of requests is above a predetermined value, rating as a requesting side is lowered in regard to the ID of the terminal. Also, in a case where a terminal issues many requests and seldom accepts responses to the requests, rating as a requesting side is lowered in regard to the ID of the terminal.

An example of a method of rating on the information providing side is as follows: If the ratio of dissatisfaction points to number of responses is above a predetermined value, rating as an information providing side is lowered.

If rating is lowered to E, an exchange of information will be difficult and the terminal is essentially excluded from the system. This serves as a penalty and makes it possible to maintain the overall ethics of the participants. However, it is necessary to prepare means for restoring an ID, which essentially has been excluded from the system, in a case where rating has been lowered for certain reasons but there is later an improvement in courtesy or ethics based upon the circumstances of the individual. To achieve this, the server 14 sets an expiration date on rating for every ID. As a result, reliability of rating is achieved while the freshness of rating is maintained. Preferably, an expiration date on points is similarly provided.

The system of this embodiment is difficult to set up unless the number of participating terminals (persons) is greater than a certain number. The point system encourages participants to consume their acquired points quickly and has the effect of increasing the number of participants.

The structure and sequence described above make it possible to construct a system for gathering responses to information requests from a wide variety of individuals.

In accordance with the present invention, as will readily be understood from the description above, an incentive such as points is awarded to an information provider, thereby stimulating the volition to provide information and leading to an increase in opportunities for use. If users increase, the reliability and convenience of the system will be enhanced by a synergistic effect.

By making it possible to set points on the information requesting side for every item of information requested, points need not be spent needlessly and information can be acquired with few points overall.

By so arranging it that information can be acquired from a specific region, the reliability with which highly precise information is obtained with regard to this region is improved. It is also possible to prevent congestion in terms of communication traffic.

By using templates, the labor involved in making inputs on both sides can be alleviated and user friendliness is enhanced. In other words, the effects of an increase in users can be expected. Specific information can be acquired in detail, in timely fashion and highly reliably as synergistic effects. By so arranging it that templates can be edited, it is possible to avoid a situation in which needless information is acquired and points are spent wastefully. This leads to a reduction in traffic in the system and makes it possible to prevent a condition where traffic becomes so heavy that terminals cannot be connected.

By rating the reliability of information providers, it is possible to select whether to acquire information from a highly rated information provider in the hope that the information will be highly reliable or to improve the quality of information by obtaining a large quantity of information from a greater number of information providers even though the reliability may be somewhat low. Further, ethics on the information providing side also will improve in an effort to provide more accurate information.

By rating the reliability of information requesting side, it is possible to prevent the mischievous requesting of information, such as a situation where a person merely makes requests but never selects a response. This has the effect of improving ethics on the requesting side.

By so arranging it that the information requesting side may follow up by contacting the information providing side, more detailed information can be obtained and it is possible to pose questions with regard to responses. This is effective in a case where an individual wishes to have a response from the same person not only for the time being but also several days later.

By not disclosing e-mail addresses and telephone numbers to the requesting side and by providing a limit on inquiries, the information providing side will not be annoyed by arrival of inquiries indefinitely and mischievous inquiries can be prevented.

By providing a time limit on ratings and points, an opportunity to recover lost credibility is granted, thereby making it possible to maintain or increase the number of terminals participating in the system and to enhance ethics.

(Other Embodiments)

According to the embodiment above, information requests and responses are created using templates. However, it is conceivable that there will be cases where a request is special and there is a frequent exchange of information that cannot be created by a template. In such case the system may be constructed on the assumption that inputs will be made freely from the start without use of templates.

Further, in the embodiment above, communication for setting up a question is performed after the server checks the location desired to be queried. If the server is accessed frequently, however, there is the danger that communication traffic will become so heavy that a connection cannot be established. In such case it will suffice to adopt an arrangement in which the server is accessed after information has accumulated to a certain extent on the terminal side. For example, it will suffice to construct a transaction sequence with respect to the server in conformity with the status of the system, such as by accessing the server after a location and keywords have been entered.

Further, in the embodiment above, whether acceptance of an information request is enabled or disabled can be set at the terminal. In addition, it may be so arranged that the manner in which an information request is accepted can be set. For example, it may be so arranged that a setting to accept only a request from a reliable person is made possible, as by allowing acceptance only for requesting terminals whose rating is A. Alternatively, it may be so arranged that only an information request of a specific type is accepted. For example, in a case where the roads near one's home tend to be congested and road conditions can be ascertained with comparative ease, it is possible to accept only road information.

Further, the reliability of an information requesting terminal and the reliability of an information providing terminal are judged based upon rating. However, performance record may be displayed in addition to rating. For example, rating, number of requests, number of responses and/or number of acquired points, etc., may be disclosed. This will make it possible for both the information requesting side and information providing side to ascertain the characteristics of the other party in greater detail. On the other hand, since there is the danger this will detract from ease of use, it will be necessary to set the above in conformity with the circumstances of the system.

According to the embodiment above, points paid by the information requesting side correspond to points received by the information providing side. In other words, points paid by the requesting side and points acquired by the information providing side are in one-to-one correspondence. However, a ratio other than 1:1 may be adopted depending upon the circumstances. For example, it may be so arranged that the information requesting side pays points to the server managing side and to the information providing side. If ten points are paid by the information requesting side, then the points acquired by the server will be five and the points acquired by the information providing side will be five. In this case it may be so adapted that the information requesting side pays the server a monetary amount equivalent to the number of points.

According to the embodiment above, it is assumed that points are used as compensation for exchange of information in the same system. However, the method of using points is not limited to the above. So-called cyber cash may be used and can be circulated in many other systems.

The present invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information exchange system for exchanging information with a plurality of portable terminals via at least one control apparatus using a communication network, wherein:
   each of said plurality of portable terminals has a wireless communication unit that is wirelessly connected for communication with the communication network;
   a first portable terminal among said plurality of portable terminals has a unit that transmits data for a specific information-provision request to a second portable terminal, which is present in a prescribed area, among said plurality of portable terminals;
   said second portable terminal has a unit for sending information back to said first portable terminal in response to an information-provision request from said first portable terminal; and
   said control apparatus accumulates prescribed points for said second portable terminal in accordance with the information sent back from said second portable terminal.

2. The system according to claim 1, wherein said first portable terminal is capable of setting number of points granted to said second portable terminal.

3. The system according to claim 1, wherein said first portable terminal has a specifying unit that specifies at least an information providing terminal, which is present in a prescribed region, as said second portable terminal.

4. The system according to claim 1, wherein said first portable terminal transmits a keyword relating to the information-provision request data to said control apparatus, and, on the basis of the keyword, said control apparatus transmits template data, which is necessary for said first portable terminal to generate information-provision request data, to said first portable terminal.

5. The system according to claim 1, wherein said control apparatus accumulates at least history information relating to provision of information by said second portable terminal and rates reliability of said second portable terminal based upon at least the history information.

6. The system according to claim 5, wherein said control apparatus accumulates at least history information relating to requesting of information by said first portable terminal and rates reliability of said first portable terminal based upon at least the history information.

7. The system according to claim 6, wherein said control apparatus retains the rating of said first portable terminal for a prescribed period of time.

8. The system according to claim 5, wherein said control apparatus retains the rating of said second portable terminal for a prescribed period of time.

9. A control method by a control apparatus for controlling exchange of information among a plurality of portable terminals which perform wireless communication via a communication network, comprising:

accepting a specific information-provision request from a first portable terminal among said plurality of portable terminals;

determining a prescribed area based on the accepted information-provision request;

sending the information-provision request to a second portable terminal in the prescribed area among said plurality of portable terminals;

accepting a response to the information-provision request from the second portable terminal; and     sending the response to the information-provision request to the first portable terminal.

10. The control method according to claim 9 further comprising accumulating prescribed points for the second portable terminal in accordance with the information sent back from the second portable terminal.

11. The control method according to claim 10 further comprising setting number of points granted to the second portable terminal in accordance with the setting by the first portable terminal.

12. The control method according to claim 9 further comprising:

receiving a keyword relating to the information-provision request data from the first portable terminal; and     transmitting, on the basis of the keyword, template data, which is necessary for the first portable terminal to generate information-provision request data, to the first portable terminal.

13. The control method according to claim 9 further comprising accumulating at least history information relating to provision of information by the second portable terminal and rating reliability of the second portable terminal based upon at least the history information.

14. The control method according to claim 9 further comprising accumulating at least history information relating to requesting of information by the first portable terminal and rating reliability of the first portable terminal based upon at least the history information.

15. A storage medium readable by a data processing apparatus, said storage storing a program which is executable by the data processing apparatus and comprises program codes realizing the control method described in claim 9.

16. A control apparatus for controlling exchange of information among a plurality of portable terminals which perform wireless communication via a communication network, comprising:

a unit adapted to accept a specific information-provision request from a first portable terminal among said plurality of portable terminals;

a unit adapted to determine a prescribed area based on the accepted information-provision request;

a unit adapted to send the information-provision request to a second portable terminal in the prescribed area among said plurality of portable terminals;

a unit adapted to accept a response to the information-provision request from the second portable terminal; and     a unit adapted to send the response to the information-provision request to the first portable terminal.

17. The control apparatus according to claim 16 further comprising a unit adapted to accumulate prescribed points for the second portable terminal in accordance with the information sent back from the second portable terminal.

18. The control apparatus according to claim 17 further comprising a unit adapted to set number of points granted to the second portable terminal in accordance with the setting by the first portable terminal.

19. The control apparatus according to claim 16 further comprising:

a unit adapted to accept a keyword relating to the information-provision request data from the first portable terminal; and     a unit adapted to transmit, on the basis of the keyword, template data, which is necessary for the first portable terminal to generate information-provision request data, to the first portable terminal.

20. The control method according to claim 16 further comprising a unit adapted to accumulate at least history information relating to provision of information by the second portable terminal and rate reliability of the second portable terminal based upon at least the history information.

21. The control apparatus according to claim 16 further comprising a unit adapted to accumulate at least history information relating to requesting of information by the first portable terminal and rate reliability of the first portable terminal based upon at least the history information.

* * * * *